United States Patent
Wei et al.

(10) Patent No.: US 8,938,334 B2
(45) Date of Patent: Jan. 20, 2015

(54) VEHICULAR STEERING ANGLE ESTIMATING APPARATUS AND ELECTRIC POWER STEERING APPARATUS MOUNTED THEREWITH

(75) Inventors: Yong Wei, Maebashi (JP); Shuji Endo, Maebashi (JP)

(73) Assignee: NSK Ltd., Tokyo (JP)

( * ) Notice: Subject to any disclaimer, the term of this patent is extended or adjusted under 35 U.S.C. 154(b) by 1733 days.

(21) Appl. No.: 12/188,458

(22) Filed: Aug. 8, 2008

(65) Prior Publication Data

US 2009/0043443 A1 Feb. 12, 2009

(30) Foreign Application Priority Data

Aug. 10, 2007 (JP) .................................. 2007-209545
Aug. 1, 2008 (JP) .................................. 2008-199296

(51) Int. Cl.
*B62D 15/02* (2006.01)

(52) U.S. Cl.
CPC .................................. *B62D 15/024* (2013.01)
USPC .......................................................... 701/41

(58) Field of Classification Search
CPC .................................................... B62D 15/024
USPC .................... 701/41–44; 318/400.15, 400.23, 318/432–434; 180/400, 412, 443, 446
See application file for complete search history.

(56) References Cited

U.S. PATENT DOCUMENTS

| | | | | |
|---|---|---|---|---|
| 5,828,973 A | * | 10/1998 | Takeuchi et al. | 701/41 |
| 6,405,113 B1 | * | 6/2002 | Yamawaki et al. | 701/41 |
| 6,789,017 B2 | * | 9/2004 | Aanen et al. | 701/41 |
| 7,164,974 B2 | * | 1/2007 | Ono et al. | 701/1 |
| 7,260,458 B2 | * | 8/2007 | Kato et al. | 701/41 |
| 7,319,927 B1 | * | 1/2008 | Sun et al. | 701/93 |
| 2003/0217885 A1 | * | 11/2003 | Aoki et al. | 180/446 |
| 2005/0071061 A1 | * | 3/2005 | Kato et al. | 701/41 |
| 2005/0103561 A1 | * | 5/2005 | Endo et al. | 180/443 |
| 2007/0083308 A1 | * | 4/2007 | Hara | 701/41 |
| 2007/0144824 A1 | * | 6/2007 | Tamaki et al. | 180/446 |
| 2008/0119986 A1 | * | 5/2008 | Wei et al. | 701/41 |

FOREIGN PATENT DOCUMENTS

| | | |
|---|---|---|
| EP | 1666837 A1 | 6/2006 |
| JP | 2001233232 A | 8/2001 |
| JP | 2002-369565 A | 12/2002 |

(Continued)

OTHER PUBLICATIONS

European Search Report Issued on May 7, 2012 in corresponding application 08014225.0.

(Continued)

*Primary Examiner* — Helal A Algahaim
*Assistant Examiner* — Genna Mott
(74) *Attorney, Agent, or Firm* — Sughrue Mion, PLLC

(57) ABSTRACT

A vehicular steering angle estimating apparatus including wheel rotational speed sensors for detecting rotational speeds of left and right wheels of a vehicle, provided with a steering angle estimating portion for estimating and outputting a estimated steering angle 1 from the wheel rotational speeds detected by the wheel rotational speed sensors, and a estimated steering angle outputting portion for outputting a estimated steering angle 2 on the basis of the estimated steering angle 1 and an SAT detected value or an SAT estimated value.

10 Claims, 16 Drawing Sheets

(56) References Cited

FOREIGN PATENT DOCUMENTS

| | | | | |
|---|---|---|---|---|
| JP | 2005/098827 | * | 4/2005 | ............. B62D 15/02 |
| JP | 2005-98827 A | | 4/2005 | |
| JP | 2006298156 A | | 11/2006 | |

OTHER PUBLICATIONS

Japanese Office Action dated Oct. 30, 2012 issued by the Japanese Patent Office in corresponding Japanese Patent Application No. 2008-199296.

* cited by examiner

VEHICULAR STEERING ANGLE ESTIMATING APPARATUS AND ELECTRIC POWER STEERING APPARATUS MOUNTED THEREWITH

BACKGROUND OF THE INVENTION

The present invention relates to a vehicular steering angle estimating apparatus for estimating a steering angle based on a rotational speed of a wheel (wheel speed), a self aligning torque (SAT) and a rotational angle of a motor and an electric power steering apparatus mounted therewith, particularly relates to a vehicular steering angle estimating apparatus capable of detecting a change in a steering characteristic of a vehicle and capable of accurately estimating an actual steering angle by preventing an erroneous estimation of the steering angle by detecting a state in which the wheel is not suitable for the estimation of the steering angle and an electric power steering apparatus mounted therewith.

An electric power steering apparatus for urging to assist a load of a steering apparatus of a vehicle by a rotational force of a motor urges to assist of a load of a steering shaft or a rack shaft by a driving force of the motor by a transmission mechanism of a gear or a belt or the like by way of a speed reducing machine. Such an electric power steering apparatus of a background art carries out a feedback control of a motor current in order to accurately generate an assist torque (steering assist force). The feedback control adjusts a voltage applied on the motor such that a difference between a current instruction value and a detected value of the motor current is reduced and the voltage applied on the motor is adjusted generally by adjusting a duty ratio of a PWM (pulse width modulation) control.

Here, explaining by showing a general constitution of an electric power steering apparatus in FIG. 15, a column shaft 2 of a steering wheel 1 is connected to a tie rod 6 of a steered wheel by way of a speed reducing gear 3, universal joints 4a and 4b and a pinion rack mechanism 5. The column shaft 2 is provided with a torque sensor 10 for detecting a steering torque of the steering wheel 1, and a motor 20 is connected to the column shaft 2 by way of the speed reducing gear 3. A control unit 30 for controlling the power steering apparatus is supplied with a power from a battery 14 and inputted with an ignition signal by way of an ignition key 11, the control unit 30 calculates a steering assist instruction value I of an assist instruction based on a steering torque Th detected by the torque sensor 10 and a vehicle speed V detected by a vehicle speed sensor 12 and controls a current supplied to the motor 20 based on the calculated steering assist instruction value I.

A steering mechanism is constructed by a constitution as shown by FIG. 16, the motor 20 exerts a rotational force (assist torque) to the column shaft 2 by way of a speed reducing gear (worm gear) 3, and an output of a motor rotational angle sensor 21 attached to the motor 20 and output of the torque sensor 10 attached to the column shaft 2 are inputted to the control unit 30. Further, the control unit 30 controls to drive the motor 20.

The control unit 30 is mainly constituted by CPU (including MPU or MCU), and FIG. 17 shows a general function executed by a program at inside of the CPU.

Explaining a function and an operation of the control unit 30 in reference to FIG. 17, the steering torque Th detected by the torque sensor is inputted to a steering assist instruction value calculating portion 32, and also the vehicle speed V detected by the vehicle speed sensor 12 is inputted to the steering assist instruction value calculating portion 32. The steering assist instruction value calculating portion 32 determines the steering assist instruction value I constituting a control target value of the current supplied to the motor 20 in reference to an assist map stored to a memory 33. The steering assist instruction value I is inputted to a subtracting portion 30A and inputted to a differential compensating portion 34 of a feed forward system for increasing a response speed, a deviation (I−i) of the subtracting portion 30A is inputted to a proportional operating portion 35 and inputted to an integral operating portion 36 for improving a characteristic of the feedback system, and a proportional output thereof is inputted to an adding portion 30B. Also outputs of the differential compensating portion 34 and the integral compensating portion 36 are inputted to add to the adding portion 30B, and a current control value E constituting a result of addition at the adding portion 30B is inputted to a motor driving circuit 37 as a motor drive signal. The motor driving circuit 37 is supplied with a power from the battery 14, a motor current value i of the motor 20 is detected by a current detecting portion 38 and the motor current value i is inputted to be fed back to the subtracting portion 30.

According to the electric power steering apparatus, it is necessary to detect or estimate a steering angle (steering angle) from a necessity of grasping a state of steering, and although the steering angle can be detected accurately when the steering angle is detected by providing a steering angle sensor, cost is increased by an amount of the steering angle sensor. Therefore, various methods of estimating a steering angle from a wheel rotational speed have been proposed in a background art. Actually, when the steering angle is estimated from only a geometrical relationship of a vehicle, there is a concern that an estimation error is brought about or the steering angle is erroneously estimated by steering, a road surface state or the like.

For example, JP-A-2005-98827 (Patent Reference 1) proposed a vehicular steering angle estimating apparatus for resolving such a problem. The apparatus disclosed in Patent Reference 1 is a vehicular steering angle estimating apparatus provided with wheel rotational angle sensors respectively for four wheels for estimating a steering angle of a vehicle based on the wheel rotational speeds from the respective wheel rotational speed sensors for detecting slip of the four wheels by comparing a relationship between the wheel rotational speeds of respective two wheels of front and rear and left and right wheels.

[Patent Reference 1] JP-A-2005-98827

However, according to the vehicular steering angle estimating apparatus disclosed in Patent Reference 1, the rotational speeds of four wheels are needed to pose a problem that the apparatus cannot deal with the vehicles providing only rotational speeds of two wheels (front wheels or rear wheels).

SUMMARY OF THE INVENTION

The invention has been carried out in view of the above-described situation and it is an object of the invention to provide a vehicular steering angle steering apparatus capable or accurately outputting a steering angle or an absolute steering angle without erroneous estimation by detecting a change in a steering characteristic not only from rotational speeds of four wheels but from only rotational speeds of two wheels by comparing a detected value of SAT or a estimated value of SAT detected or estimated by a steering mechanism and a calculated value of SAT estimated by a calculation. Further, it is an object of the invention to provide an electric power steering apparatus mounted with the vehicular angle estimating apparatus.

According to a first aspect of the invention, there is provided a vehicular steering angle estimating apparatus including:

Vehicle rotational speed sensors for detecting rotational speeds of left and right wheels of a vehicle, a physical quantity calculating portion for calculating and outputting a physical quantity acting on from the wheels to a steering on the basis of the rotational speeds of the wheels detected by the vehicle rotational speed sensors, and an estimated steering angle outputting portion for outputting an estimated steering angle 2 on the basis of the estimated physical quantity and an SAT detected value or an SAT estimated value.

According to a second aspect of the invention, there is provided the vehicular steering angle estimating apparatus according to the first aspect, wherein the physical quantity is an estimated steering angle 1 corresponding to a steering angle, and the estimated steering angle outputting portion includes:

an SAT calculating section for calculating an SAT calculated value on the basis of the estimated steering angle 1, a comparing and determining section for comparing an absolute value of a difference between the SAT calculated value and the SAT detected value or the SAT estimated value, and a switching section for making an output of the estimated steering angle 1 as the estimated steering angle 2 ON/OFF on the basis of a result of the comparing and determining section.

According to a third aspect of the invention, there is provided the vehicular steering angle estimating apparatus according to the first aspect, wherein the physical quantity is an SAT calculated value corresponding to the SAT acting on the wheel from a road surface, and a steering angle estimating section for estimating a estimated steering angle 1 according to the SAT calculated value is provided, and the estimated steering angle outputting portion includes:

a comparing and determining section for comparing an absolute value of a difference between the SAT calculated value and the SAT detected value or the SAT estimated value with the predetermined value 1, and a switching section for making an output of the estimated steering angle 1 as the estimated steering angle 2 turn on and off on the basis of a result of the comparing and determining section.

According to a forth aspect of the invention, there is provided the vehicular steering angle estimating apparatus according to the first aspect, wherein the physical quantity is an estimated steering angle 1 corresponding to an angle, and the estimated steering angle outputting portion includes:

a steering angle calculating section for calculating a calculated steering angle 3 on the basis of the SAT detected value or the SAT estimated value, a comparing and determining section for comparing an absolute value of a difference of the estimated steering angle 1 and the calculated steering angle 3 with a predetermined value 2, and a switching section for making an output of the estimated steering angle 1 as the estimated steering angle 2 ON/OFF on the basis of a result of the comparing and determining section.

According to a fifth aspect of the invention, there is provided the vehicular steering angle estimating apparatus according to any one of the first through third aspects, wherein the comparing and determining section is made to output the estimated steering angle 1 as the estimated steering angle 2 by way of the switching section, when an absolute value of the SAT difference is equal to or smaller than the predetermined value 1 and continued for a predetermined time period or more.

According to a sixth aspect of the invention, there is provided the vehicular steering angle estimating apparatus according to any one of the first through third aspects, wherein the comparing and determining section is made not to output the estimated steering angle 1 as the estimated steering angle 2, when an absolute value of the SAT difference is larger than the predetermined value 1.

According to a seventh aspect of the invention, there is provide the vehicular steering angle estimating apparatus according to the first or forth aspect, wherein the comparing and determining section is made to output the estimated steering angle 1 as the estimated steering angle 2 by way of the switching section, when an absolute value of the steering angle difference is equal to or smaller than the predetermined value 2 and continued for a predetermined time period or more.

According to an eighth aspect of the invention, there is provided the vehicular steering angle estimating apparatus according to the first or forth aspect, wherein the comparing and determining section is made not to output the estimated steering angle 1 as the estimated steering angle 2, when the absolute value of the steering angle difference is larger than the predetermined value 2.

According to a ninth aspect of the invention, there is provided a vehicular steering angle estimating apparatus including:

a motor rotational angle sensor for detecting a motor rotational angle of a motor for exerting a steering assisting force to a steering system of a vehicle, wheel rotational speed sensors for detecting rotational speeds of left and right wheels of the vehicle, a steering angle estimating portion for estimating a estimated steering angle 1 from the wheel rotational speeds detected by the wheel rotational speed sensors, an estimated steering angle outputting portion for calculating an SAT calculated value on the basis of the estimated steering angle 1, calculating an absolute value of a difference between the SAT calculated value and an SAT detected value or an SAT estimated value, and outputting an estimated steering angle 2 by an absolute value of the SAT difference, and an absolute steering angle estimating portion for outputting an absolute steering angle 1 by the estimated steering angles 1 and 2, the absolute value of the SAT difference, and a relative steering angle constituted by dividing the motor rotational angle by a speed reducing ratio of the steering system.

According to a tenth aspect of the invention, there is provided a vehicular steering angle estimating apparatus including:

a motor rotational angle sensor for detecting a motor rotational angle of a motor for exerting a steering assisting force to a steering system of a vehicle, and wheel rotational speed sensors for detecting rotational speeds of left and right wheels of the vehicle, a steering angle estimating portion for estimating to output an estimated steering angle 1 from the wheel rotational speeds detected by the wheel rotational speed sensors, an estimated steering angle outputting portion for calculating a calculated steering angle 3 on the basis of an SAT calculated value and an SAT detected value or an SAT estimated value, calculating an absolute value of a difference between the calculated steering angle 3 and the estimated steering angle 1 and outputting a estimated steering angle 2 by an absolute value of the steering angle difference, and an absolute steering angle estimating portion for outputting an absolute steering angle 1 by the estimated steering angles 1 and 2, the absolute value of the steering angle difference, and a relative steering angle constituted by dividing the motor rotational angle by a speed reducing ratio of the steering system.

According to an eleventh aspect of the invention, there is provided the vehicular steering angle estimating apparatus according to the ninth or tenth aspect, wherein the absolute steering angle estimating portion includes:

an absolute steering angle calculating portion for calculating an absolute steering angle 2 on the basis of the estimated steering angle 2 and the relative steering angle, and a correcting and outputting portion for outputting the absolute steering angle 1 constituted by correcting the absolute steering angle 2, when an absolute value of the SAT difference or an absolute value of the steering angle difference is equal to or smaller than the predetermined value 1 and a predetermined time period 1 has elapsed.

According to a twelfth aspect of the invention, there is provided the vehicular steering angle estimating apparatus according to the ninth or eleventh aspect, wherein the estimated steering angle outputting portion includes:

an SAT calculating section for calculating the SAT calculated value on the basis of the estimated steering angle 1, a comparing and determining section for comparing an absolute value of a difference between the SAT calculated value and the SAT detected value or the SAT estimated value with a predetermined value 2, and a switching section for making an output of the estimated steering angle 1 as the estimated steering angle 2 ON/OFF on the basis of a result of the comparing and determining section.

According to a thirteenth aspect of the invention, there is provided the vehicular steering angle estimating apparatus according to the tenth or eleventh aspect, wherein the estimated steering angle outputting portion includes:

a steering angle calculating section for calculating a calculated steering angle 3 on the basis of the SAT detected value or the SAT estimated value, a comparing and determining section for comparing an absolute value of a difference between the estimated steering angle 1 and the calculated steering angle 3 with a predetermined value 3, and a switching section for making an output of the estimated steering angle 1 as the estimated steering angle 2 ON/OFF on the basis of a result of the comparing and determining section.

According to a fourteenth aspect of the invention, there is provided the vehicular steering angle estimating apparatus according to any one of the ninth, eleventh and twelfth aspects, wherein the comparing and determining section outputs the estimated steering angle 1 as the estimated steering angle 2 by way of the switching section, when the absolute value of the SAT difference is equal to or smaller than the predetermined value 2 and continued for a predetermined time period 2 or more.

According to a fifteenth aspect of the invention, there is provided the vehicular steering angle estimating apparatus according to anyone of the ninth, eleventh and twelfth aspects, wherein the comparing and determining section is made not to output the estimated steering angle 1 as the estimated steering angle 2, when an absolute value of the SAT difference is larger than the predetermined value 2.

According to a sixteenth aspect of the invention, there is provided the vehicular steering angle estimating apparatus according to any one of the tenth, eleventh and thirteenth aspects, wherein the comparing and determining section outputs the estimated steering angle 1 as the estimated steering angle 2 by way of the switching section, when an absolute value of the steering angle difference is equal to or smaller than the predetermined value 3 and continued for a predetermined time period 3 or more.

According to a seventeenth aspect of the invention, there is provided the vehicular steering angle estimating apparatus according to any one of the tenth, eleventh and thirteenth aspects, wherein the comparing and determining section is made not to output the estimated steering angle 1 as the estimated steering angle 2, when an absolute value of the steering angle difference is larger than the predetermined value 3.

According to an eighteenth aspect of the invention, there is provided a vehicular steering angle estimating apparatus including:

a motor rotational angle sensor for detecting a motor rotational angle of a motor for exerting a steering assisting force to a steering system of a vehicle, wheel rotational speed sensors for detecting rotational speeds of left and right wheels of the vehicle, a steering angle estimating portion for calculating to output an estimated steering angle 1 from the wheel rotational speeds detected by the wheel rotational speed sensors, an estimated steering angle outputting portion for calculating a relative steering angle constituted by dividing the motor rotational angle by a speed reducing ratio of the steering system, and outputting an estimated steering angle 2 by a change rate difference absolute value constituting a difference between a change rate of an SAT detected value or an SAT estimated value relative to the relative steering angle and a predetermined value 1, and an absolute steering angle estimating portion for outputting an absolute steering angle 1 by the estimated steering angles 1 and 2, the change rate difference absolute value, and the relative steering angle.

According to a nineteenth aspect of the invention, there is provided the vehicular steering angle estimating apparatus according to the eighteenth aspect, wherein the absolute steering angle estimating portion includes:

an absolute steering angle calculating portion for calculating an absolute steering angle 2 on the basis of the estimated steering angle 2 and the relative steering angle, and a correcting and outputting portion for comparing the SAT change rate difference absolute value with a predetermined value 2 and outputting the absolute steering angle 1 constituted by correcting the absolute steering angle 2, when the change rate difference absolute value is equal to or smaller than the predetermined value 2 and a predetermined time period 1 has elapsed.

According to a twentieth aspect of the invention, there is provided the vehicular steering angle estimating apparatus according to the eighteenth or nineteenth aspect, wherein the estimated steering angle outputting portion includes:

a comparing and determining section for comparing the absolute value of the SAT change rate with the predetermined value 1, and a switching section for making an output of the estimated steering angle 1 as the estimated steering angle 2 ON/OFF on the basis of a result of the comparing and determining section.

According to a twenty-first aspect of the invention, there is provided the vehicular steering angle estimating apparatus according to any one of the eighteenth through twentieth aspects, wherein the comparing and determining section outputs the estimated steering angle 1 as the estimated steering angle 2 by way of the switching section, when the absolute value of the SAT change rate difference is equal to or smaller than the predetermined value 1 and continued for a predetermined time period 2 or more.

According to a twenty-second aspect of the invention, there is provided the vehicular steering angle estimating apparatus according to any one of the eighteenth through twentieth aspects, wherein the comparing and determining section is made not to output the estimated steering angle 1 as the estimated steering angle 2, when the absolute value of the SAT change rate difference is larger than the predetermined value 1.

According to a twenty-third aspect of the invention, there is provided an electric power steering apparatus including:

the vehicular steering angle estimating apparatus according to any one of the first through twenty-second aspects.

According to the vehicular steering angle estimating apparatus of the invention, the change in the steering characteristic of the vehicle is detected and a state of not being suitable for estimating the steering angle as in slipping the wheel is detected, and therefore, an erroneous estimation of the steering angle can be always prevented, and the steering angle or the absolute steering angle can accurately be estimated. Further, the invention estimates to output the steering angle from wheel speed signals of four wheels or two wheels, and therefore, the vehicles capable of dealing therewith is not restricted.

If the vehicular steering estimating apparatus is provided on an electric power steering apparatus, even if a wheel goes into a skid, an accurate steering control can be realized.

DETAILED DESCRIPTION OF THE PREFERRED EMBODIMENTS

Figure 1:
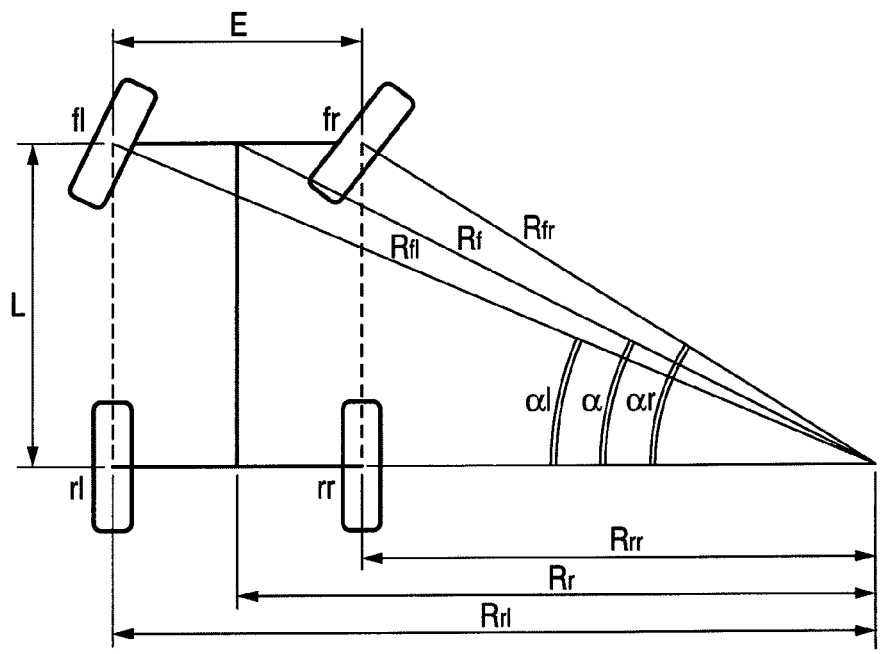
FIG. 1 is a schematic diagram for explaining a wheel speed difference.

A vehicular steering angle estimating apparatus according to the invention compares an SAT detected value or an SAT estimated value (although in the following, simply referred to as "SAT detected value", an SAT estimated value is included) detected or estimated by a steering mechanism, and an SAT calculated value calculated by a calculation as a physical quantity, certainly detects a change in a steering characteristic not only from rotational speeds (vehicle speeds) of four wheels but from rotational speeds (wheel speeds) of two wheels, and estimates accurately a steering angle or an absolute steering angle to further be corrected and outputted in a state in which a wheel is suitable for estimation of a steering angle. Therefore, the steering angle or the absolute steering angle can be estimated and outputted accurately without erroneous estimation not only by four wheels but also by two wheels.

Even if a wheel goes into a skid, an accurate steering control can be realized by providing such a vehicular steering estimating apparatus of high accuracy on an electric power steering apparatus.

An embodiment of the invention will be explained in reference to the drawing as follows.

First, a relationship between a steering angle (steering angle) of a vehicle and a wheel rotational speed (wheel speed) will be explained.

Figure 2:
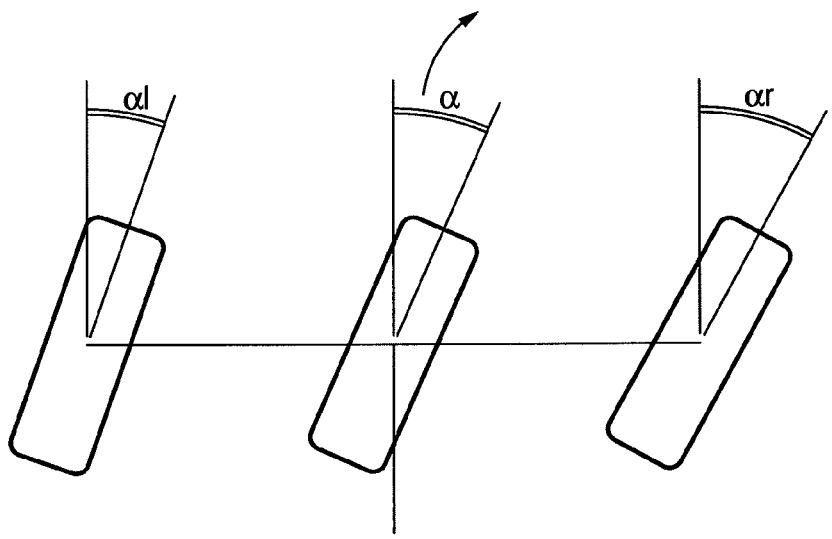
FIG. 2 is a schematic diagram for explaining the wheel speed difference.

As shown by FIG. 1, respective turning radii of four wheels fl, fr, rl, rr are designated by notations $R_{fl}$, $R_{fr}$, $R_{rl}$, $R_{rr}$, steering angles of front wheels fl, fr are conveniently designated by notations αl, αr, an axle distance of a vehicle is designated by notation L, and a vehicle width (a distance between centers of left and right wheel) is designated by notation E. Further, a turning radius of a center of an axle of front wheels is designated by notation Rf, and a turning radius of a center of an axle of rear wheels is designated by notation Rr. Further, when as wheel rotational speeds (wheel angular speeds) of respective wheels fl, fr, rl, rr, left front wheel is designated by notation $\omega_{fl}$, right front wheel is designated by notation $\omega_{fr}$, left rear wheel is designated by notation $\omega_{rl}$, right rear wheel is designated by notation $\omega_{rr}$, it is known that a steering angle α of a center of a vehicle body (refer to FIG. 2) and respective wheel rotational speeds $\omega_{fl}$, $\omega_{fr}$, $\omega_{rl}$, $\omega_{rr}$ and a steering angle $\alpha_{front}$ of front wheel and steering angle rear of rear wheel are respectively provided with relationships of Equation 1 and Equation 2.

$$\alpha_{front} = \frac{1}{2}\arcsin\left\{\frac{4L}{E}\left(\frac{\omega_{fl} - \omega_{fr}}{\omega_{fl} + \omega_{fr}}\right)\right\} \quad \text{[Equation 1]}$$

$$\alpha_{rear} = \arctan\left\{\frac{2L}{E}\left(\frac{\omega_{rl} - \omega_{rr}}{\omega_{rl} + \omega_{rr}}\right)\right\} \quad \text{[Equation 2]}$$

The steering angle $\alpha_{front}$ of Equation 1 and the steering angle $\alpha_{rear}$ of Equation 2 correspond to an estimated steering angle $\theta_{est1}$ of the invention and the steering angle can be estimated from the wheel rotational speeds.

Further, a calculation of a steering angle estimating portion may calculate Equation 1 and Equation 2 or may be constituted by a lookup table for inputting $(\omega_{fl}-\omega_{fr})/(\omega_{fl}+\omega_{fr})$ and $(\omega_{rl}-\omega_{rr})/(\omega_{rl}+\omega_{rr})$. Further, the wheel rotational speeds are already present in a vehicle having ABS (anti-lock brake system), and therefore, the wheel rotational speeds can be utilized as they are, and the steering angle can be calculated (estimated) from the wheel rotational speeds.

According to the invention, the steering angle is estimated on the basis of the SAT calculated value calculated by CPU etc. and the SAT detected value detected by a steering mechanism including the SAT estimated value, and therefore, SAT will be explained as follows.

Figure 3:
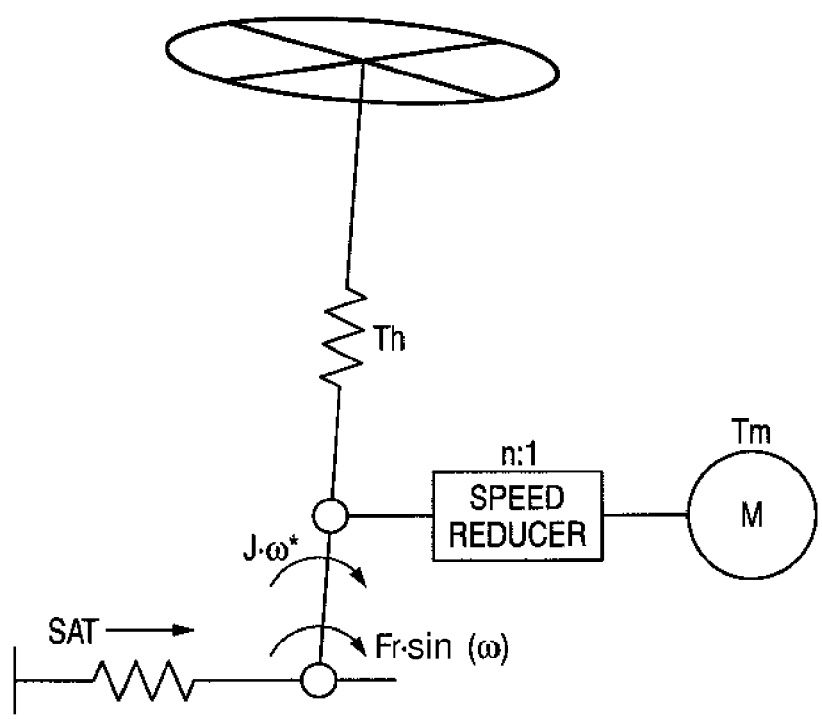
FIG. 3 is a schematic view showing a behavior of a torque generated from a road surface to steering.

SAT is a force of returning a steering wheel to an original position, as shown by FIG. 3, a steering torque Th is generated by steering the steering wheel by a driver, and a motor M generates an assist torque Tm in accordance with the steering torque Th. As a result, the front wheel is steered and SAT is generated as a reaction force. At that occasion, a torque constituting a resistance against steering the steering wheel is generated by an equivalent inertia J combined with an inertia of the motor M of an inertia of a steering mechanism portion and a friction torque Fr and considering a balance of the forces, an equation of motion of Equation 3 shown below is provided (for example, JP-A-2002-369565). Further, notation $\omega$ designates angular speed and notation $\omega^*$ designates an angular acceleration.

$$SAT = Th + Tm - J \cdot \omega^* - Fr \cdot \text{sign}(\omega) \quad \text{[Equation 3]}$$

Although in the embodiment of the invention, the SAT estimated value estimated by Equation 3 is used as an SAT detected value SAT2, the SAT value detected by the SAT sensor may be used as the SAT detected value SAT2.

A specific embodiment of the invention will be explained as follows in reference to the drawings.

Figure 4:
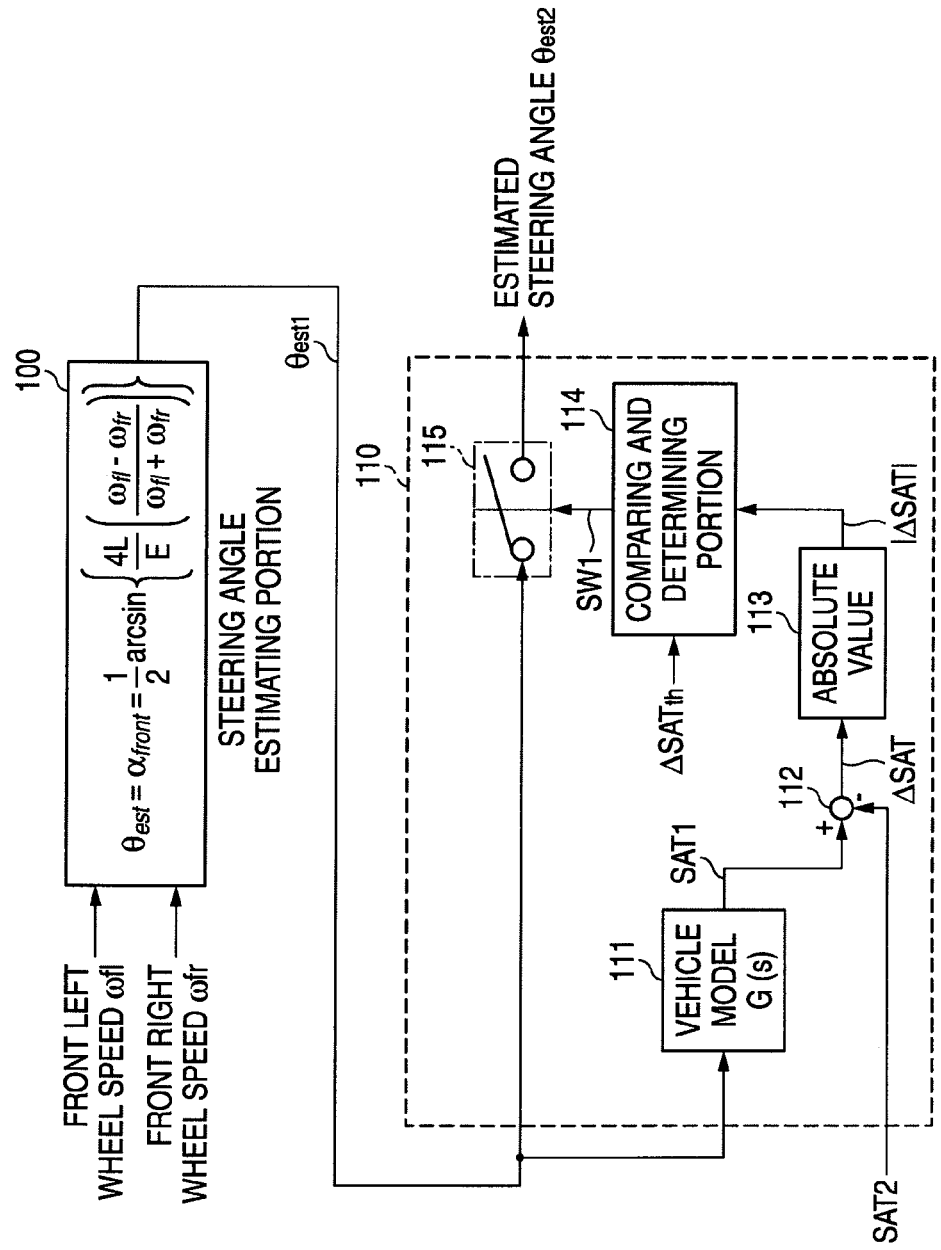
FIG. 4 is a block diagram showing a constitution example of a first embodiment of the invention.

First, FIG. 4 shows a first embodiment of a vehicular steering angle estimating apparatus according to the invention and a case in which only the front wheel rotational speeds $\omega_{fr}$ and $\omega_{fl}$ can be utilized will be explained.

The vehicular steering angle estimating apparatus of the invention is constituted by a steering angle estimating portion 100 and an estimated steering angle outputting portion 110 for outputting an estimated steering angle $\theta_{est2}$ on the basis of an estimated steering angle $\theta_{est1}$ and an SAT detected value SAT2 from an SAT sensor, an SAT estimating portion or the like. Further, the estimated steering angle outputting portion 110 is constituted by a vehicle model (G(s)) 111 for operating to calculate SAT from the estimated steering angle $\theta_{est1}$ by a vehicle model function G(s), a subtracting portion 112 for calculating a difference $\Delta SAT$ (=SAT1−SAT2) by subtracting the SAT detected value SAT2 from the SAT calculated value SAT1 calculated by the vehicle model 111, an absolute value forming portion 113 for calculating an absolute value |$\Delta SAT$| of the difference $\Delta SAT$ provided by the subtracting portion 112, a comparing an determining portion 114 for comparing the absolute value |$\Delta SAT$| and a previously set threshold $\Delta SAT_{th}$ and outputting a switch signal SW1 by measuring an elapse of a predetermined time period, and a switching portion 115 for making an output of the estimated steering angle $\theta_{est1}$ ON/OFF by the switch signal SW1.

Here, that the vehicle model (G(s)) 111 can calculate SAT (SAT calculated value SAT1) by the steering angle 9 (estimated steering angle $\theta_{est1}$) will be explained.

The equation of motion of the vehicle expressed by Equation 4 by constituting coefficients of Equation 5 by $a_{11}$, $a_{12}$, $a_{21}$, $a_{22}$, $b_{11}$, $b_{21}$.

$$\begin{bmatrix} \dot{\beta} \\ \dot{\gamma} \end{bmatrix} = \begin{bmatrix} a_{11} & a_{12} \\ a_{21} & a_{22} \end{bmatrix} \begin{bmatrix} \beta \\ \gamma \end{bmatrix} + \begin{bmatrix} b_{11} \\ b_{21} \end{bmatrix} \delta_f \quad \text{[Equation 4]}$$

$$a_{11} = -\frac{2(K_f + K_r)}{mV} \quad \text{[Equation 5]}$$

$$a_{12} = -1 - \frac{2(l_f K_f - l_r K_r)}{mV^2}$$

$$a_{21} = -\frac{2(l_f K_f - l_r K_r)}{I}$$

$$a_{22} = -\frac{2(l_f^2 K_f + l_r^2 K_r)}{IV}$$

$$b_{11} = \frac{2K_f}{mV}$$

$$b_{21} = \frac{2l_f K_f}{I}$$

Incidentally, notation m designates a vehicle mass, notation I designates a vehicle moment of inertia, notation $l_f$ designates a distance between a vehicle gravitational center point and a front shaft, notation $l_r$ designates a distance between the vehicle gravitational point and a rear shaft, notation $K_f$ designates a cornering power of a front wheel tire, notation $K_r$ designates a cornering power of a rear wheel tire, notation V designates a vehicle speed, notation N designates an over roll steering ratio, notation $\delta_f$ designates an actual steering angle ($\delta_f = \theta/N$), notation $\beta$ designates a slip angle of a vehicle gravitational point, and notation $\gamma$ designates a yaw rate.

A relationship between the steering angle $\theta$ and SAT is calculated as in Equation 7 shown below from Equation 4 and Equation 5 shown above.

Further, an equation of SAT is expressed by Equation 6 shown below.

$$SAT = \begin{bmatrix} c_{11} & c_{12} \end{bmatrix} \begin{bmatrix} \beta \\ \gamma \end{bmatrix} + [d_{11}]\delta_f \quad \text{[Equation 6]}$$

Incidentally, by constituting trail by $\epsilon$, coefficient $c_{11}=-2\epsilon K_f$, $c_{12}=-2\epsilon k_f l_f/V$, $d_{11}=2\epsilon K_f$.

$$SAT = G(s) \times \theta \quad \text{[Equation 7]}$$

By Equation 7 shown above, SAT can be calculated from the steering angle $\theta$ and the vehicle model G(s). Further, although the vehicle model G(s) is the function of the vehicle speed and calculated from Equation 4 and Equation 5, the vehicle model G(s) may be calculated by a simulation by using a vehicle motion model after measuring a characteristic value for each vehicle by an experiment. Further, the steering angle $\theta$ can be calculated by SAT from Equation 6 on the basis of a vehicle inverse model $G^{-1}(s)$. The vehicle inverse model $G^{-1}(s)$ can be calculated by measurement similar to the vehicle model G(s).

In such a constitution, the steering angle estimating portion 100 operates Equation 1 shown above on the basis of the inputted front wheel rotational speeds of $\omega_{fl}$ and $\omega_{fr}$ and outputs the estimated steering angle $\theta_{est1}$. The operation may use a lookup table. The estimated steering angle $\theta_{est1}$ is inputted to the vehicle model 111 and the switching portion 115, the vehicle model 111 calculates SAT on the basis of the estimated steering angle $\theta_{est1}$. The SAT calculated value SAT1 calculated by the vehicle model 111 is inputted to the subtracting portion 112 and the absolute value |ΔSAT| of the difference ΔSAT between SAT1 and the SAT detected value SAT2 at the absolute value forming portion 113. The comparing and determining portion 114 is previously inputted with a set value $\Delta SAT_{th}$ as the threshold, the comparing and determining portion 114 determines whether the absolute value |ΔSAT| becomes equal to or smaller than the set value $\Delta SAT_{th}$ and a predetermined time period has elapsed, outputs the switch signal SW1 when the absolute value |ΔSAT of the difference becomes equal to or smaller than the set value $\Delta SAT_{th}$ and the predetermined time period has elapsed and makes the switching portion 115 ON. Thereby, the estimated steering angle $\theta_{est1}$ estimated at the steering angle steering portion 110 is outputted as the estimated steering angle $\theta_{est2}$. That is, when the absolute value |ΔSAT| of the difference exceeds the set value $\Delta SAT_{th}$, it is determined that the steering characteristic is changed, it is determined that the estimated steering angle $\theta_{est1}$ cannot be trusted and does not output the estimated steering angle as the steering angle, and when the absolute value |ΔSAT| of the difference becomes equal to or smaller than the set value $\Delta SAT_{th}$, and the state has elapsed for the predetermined time period, it is determined that the estimated steering angle can be trusted and the estimated steering angle $\theta_{est1}$ is outputted as the estimated steering angle $\theta_{est2}$.

Figure 5:
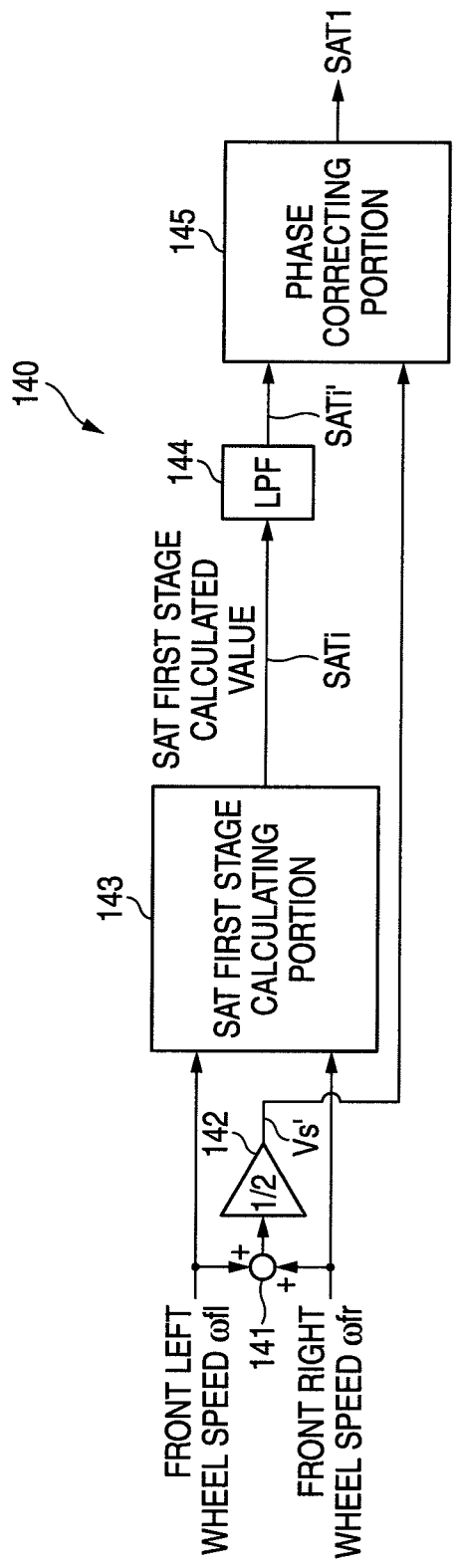
FIG. 5 is a block diagram showing a constitution example for calculating SAT calculated value.

In this case, referring to FIG. 5, explanations will be made into an example of the constitution of SAT1 calculating portion 140 for calculating the SAT calculated value SAT1 by the wheel rotational speeds $\omega_{fl}/\omega_{fr}$ of two wheels.

The SAT calculating portion 140 includes: an SAT first stage calculating portion 143 for calculating an SAT first stage calculated value SAT1 according to the wheel rotational speeds $\omega_{fl}$, $\omega_{fr}$ or inputted from the wheel rotational speed sensor of the front wheels; a low pass filter (LPF) 144 for removing noise of the SAT first stage calculated value SAT1 calculated by the SAT first stage calculating portion 143; an addition portion 141 for adding the wheel rotational speeds $\omega_{fl}$, $\omega_{fr}$ inputted; an average value calculating portion 142 for calculating a vehicle speed corresponding value Vs' by calculating ½ of the addition value of the wheel rotational speeds $\omega_{fl}$, $\omega_{fr}$; and a phase correcting portion 145 for outputting an SAT calculated value SAT1 by executing a phase correction of the SAT first stage calculated value SAT', from which noise has been removed, outputted from the low pass filter according to the vehicle speed corresponding value Vs' calculated by the average value calculating portion 142.

According to the wheel rotational speeds $\omega_{fl}$, $\omega_{fr}$ inputted, the SAT first stage calculating portion 143 executes the following calculation of Equation 8 and calculates a wheel rotational speed difference Δω between the right and left wheels according to the vehicle speed.

$$\Delta\omega=(\omega_{fl}-\omega_{fr})/\{(\omega_{fl}+\omega_{fr})/2\} \quad \text{[Equation 8]}$$

Figure 6:
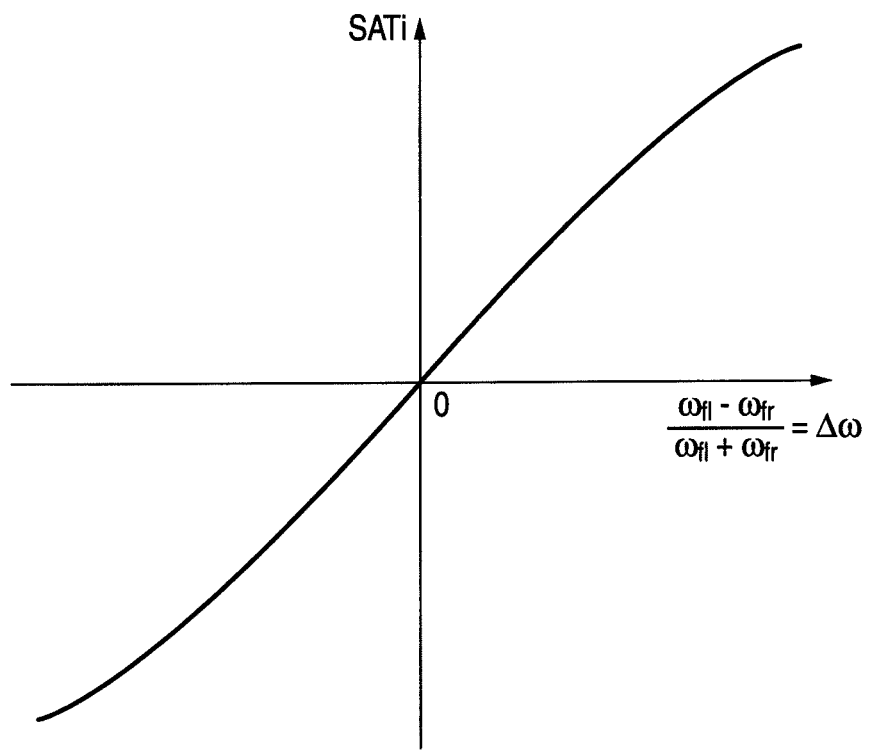
FIG. 6 is a graph showing a characteristic line of an example of a map for calculating an initial calculated value of SAT.

Referring to the SAT first stage calculated value calculating map shown in FIG. 6, the SAT first stage calculating portion 143 calculates the SAT first stage calculated value SAT1 on the basis of the wheel rotational speed difference Δω between the right and left wheels. The characteristic of the SAT first stage calculated value calculating map is set as follows. On the SAT first stage calculated value calculating map, in the state shown in FIG. 6 in which the wheel rotational speed difference Δω between the right and left wheels is zero, that is, in the state in which the vehicle is going straight, the SAT first stage calculated value SAT1 is "0". When the wheel rotational speed difference Δω between the right and left wheels is increased in the positive and the negative direction, the SAT first stage calculated value SAT1 is increased and at the same time a ratio of the increase is reduced.

In the present invention, the SAT detected value SAT2 detected by the steering mechanism and the SAT calculated value SAT1 calculated from the wheel rotational speed as described above are compared with each other. Therefore, not only from the rotational speeds of 4 wheels but also only from the rotational speeds of 2 wheels, a change in the steering characteristic is detected. Accordingly, no erroneous estimation is caused and a steering angle or an absolute steering angle is estimated highly accurately.

Figure 7:
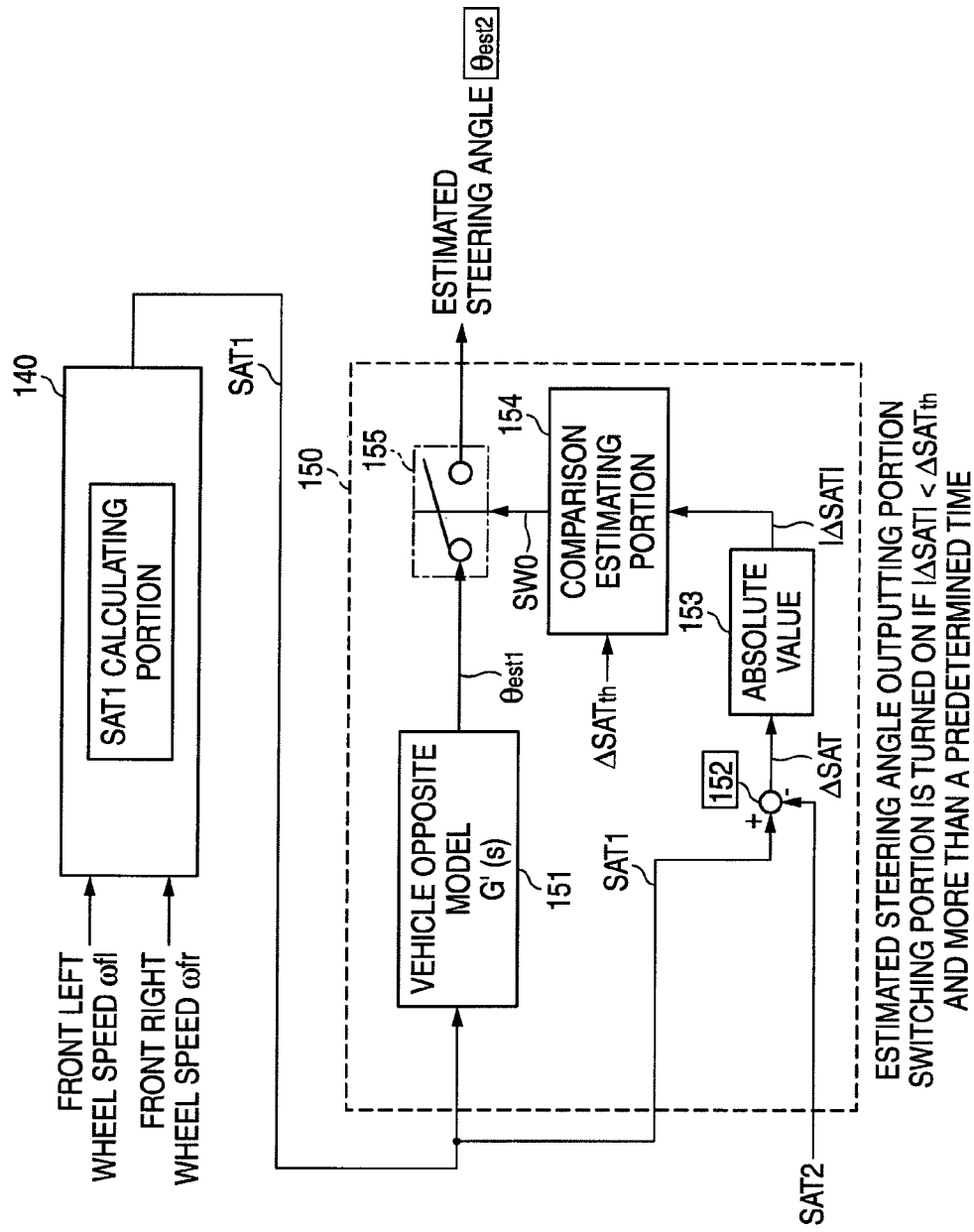
FIG. 7 is a block diagram showing a constitution example of a second embodiment of the invention.

In the case where a type of vehicle, in which only the front wheel speed can be picked up, is taken as an example (the second embodiment), a constitution of the steering angle estimating apparatus is shown in FIG. 7 and explained below.

In the steering mechanism, the SAT calculated value SAT1 is calculated from the wheel rotational speeds $\omega_{fl}$, $\omega_{fr}$ by the SAT calculating portion 140 on the basis of the relation shown in FIG. 6 as described above. The SAT calculated value SAT1 is inputted into the vehicle opposite model 151 in the estimated steering angle outputting portion 150 and the subtracting portion 152. The estimated steering angle $\theta_{est1}$ calculated by the vehicle inverse model $G^{-1}$ (s) 151 is inputted into the switching portion 155. In the subtracting portion 152 in the estimated steering angle outputting portion 150, a difference between the SAT calculated value SAT1 and the SAT detected value SAT2, which is detected (estimated) by the measurement portion, is calculated and an absolute value |ΔSAT| (=|SAT1−SAT2|) of the difference is calculated by the absolute value making portion 153. The absolute value |ΔSAT| of the difference is compared with the threshold value $\Delta SAT_{th}$ which is previously set in the comparison estimating portion 154. According to the result of the comparison and the time, the switching signal SW0 for turning on and off the switching portion 155 is outputted. That is, when the absolute value |ΔSAT| of the difference exceeds the threshold value $\Delta SAT_{th}$, it is judged that the steering characteristic has changed and the steering angle is erroneously estimated and it is judged that the estimated steering angle $\theta_{est1}$ is untrustworthy. Therefore, the switching portion 155 is turned off so that the estimated steering angle $\theta_{est1}$ can not be outputted as the estimated steering angle $\theta_{est2}$. When the absolute value |ΔSAT| of the difference is not more than the threshold value $\Delta SAT_{th}$ and continues for a predetermined period of time, it is judged that the estimated steering angle $\theta_{est1}$ is trustworthy and the switching portion 155 is turned on and the estimated steering angle $\theta_{est1}$ is outputted as the estimated steering angle $\theta_{est2}$.

In this embodiment, the SAT calculated value SAT1 is calculated from the wheel speed. However, in the present invention, not only the SAT1 but also the steering torque can be calculated from the wheel speed and then this calculated steering torque and the actual steering torque (the detected value of the torque sensor) are compared with each other, the estimated steering angle is outputted on the basis of the comparison result. That is, an output of the steering angle may be controlled according to the steering torque instead of the SAT.

Figure 8:
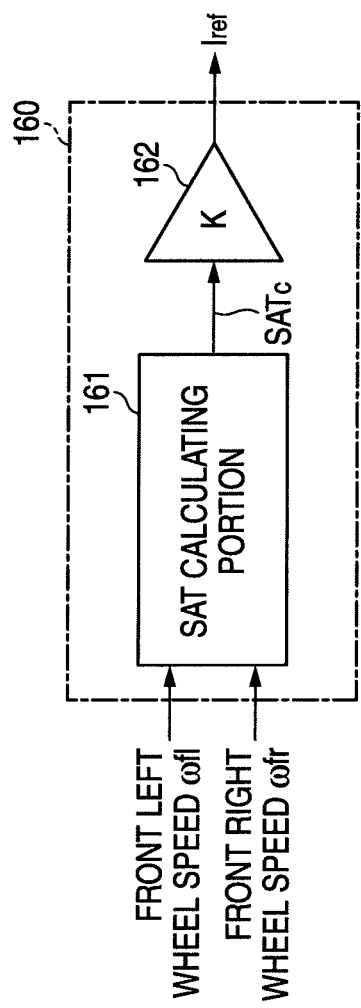
FIG. 8 is a block diagram showing a constitution example of an apparatus for calculating a steering torque (steering current instruction value) on the basis of a wheel speed.

FIG. 8 shows an example of apparatus in which a steering torque is calculated from a wheel speed. From the wheel rotational speeds $\omega_{fl}$ and $\omega_{fr}$, the calculated (detection) of the SAT is made by the SAT calculating portion 161 and the calculated $SAT_e$ is multiplied by K times in the gain portion 162. Due to the foregoing, the calculated steering electric current command value $I_{ref}$, that is, the calculated steering torque can be obtained. An actual steering torque is detected by the torque sensor.

Although according to the first and second embodiments, the estimated steering angle $\theta_{est2}$ is outputted on the basis of comparison with SAT, the estimated steering angle $\theta_{est2}$ may be outputted on the basis of comparison of the steering angle θ.

Figure 9:
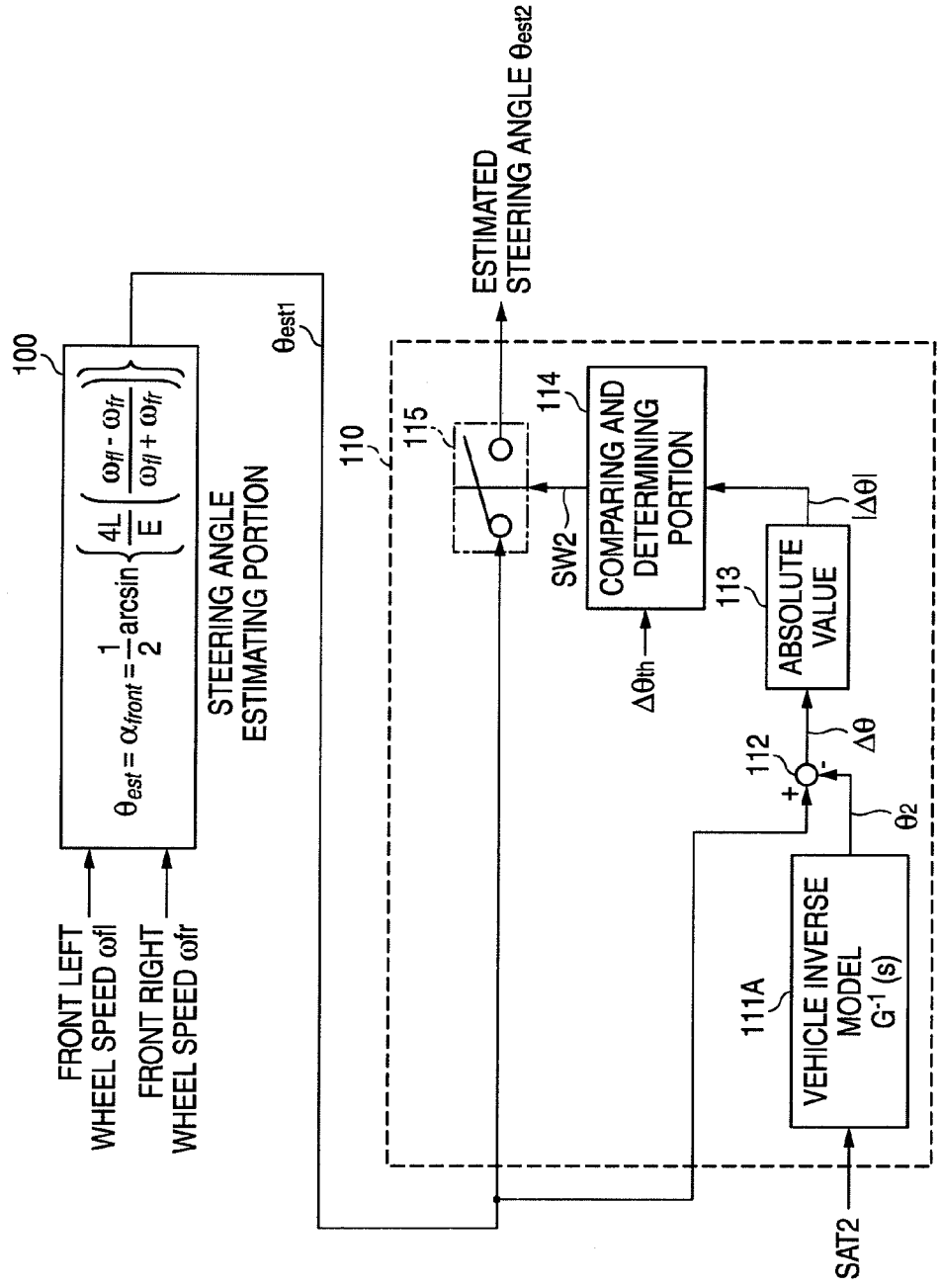
FIG. 9 is a block diagram showing a constitution example of a third embodiment of the invention.

FIG. 9 shows such a third embodiment in correspondence with FIG. 4, the calculated steering angle θ2 is calculated by way of a vehicle inverse model ($G^{-1}(s)$) 111A from the SAT detected value SAT2, subtracted from the estimated steering angle $\theta_{est1}$ at the subtracting portion 112 and an absolute value |Δθ| of a difference Δθ is calculated at the absolute value forming portion 113. The absolute value |Δθ| of a difference Δθ is inputted to the comparing and determining portion 114, and the comparing and determining portion 114 compares the absolute value with a previously inputted set value $\Delta\theta_{th}$. Further, when the absolute value |Δθ| of the difference Δθ becomes equal to or smaller than the set value $\Delta\theta_{th}$ and the predetermined time period has elapsed, the switch signal SW2 is outputted and the switching portion 115 is made ON. When the absolute value |Δθ| of the difference Δθ is larger than the set value $\Delta\theta_{th}$, the estimated steering angle $\theta_{est2}$ is not outputted.

Figure 10:
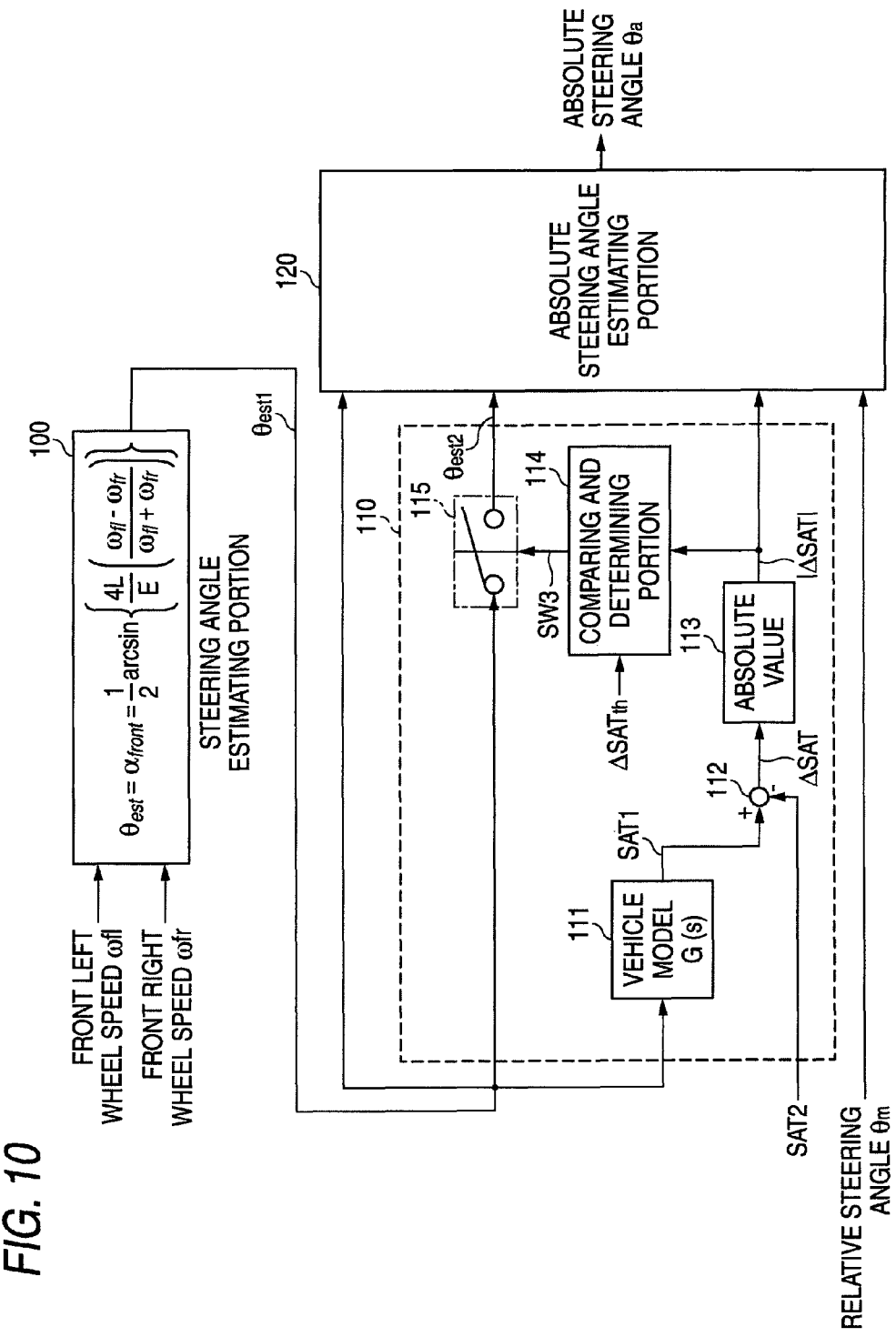
FIG. 10 is a block diagram showing a constitution example of a forth embodiment of the invention.

Next, FIG. 10 shows a forth embodiment of the vehicular steering angle estimating apparatus according to the invention and a case in which only the front wheel rotational speeds $\omega_{fl}$ and $\omega_{fr}$ can be utilized will be explained. Members the same as those of the first embodiment of FIG. 4 are attached with the same notations.

The vehicular steering angle estimating apparatus of the forth embodiment is constituted by the steering angle estimating portion 100 for estimating the steering angle $\theta_{est1}$ on the basis of the front wheel rotational speeds $\omega_{fl}$ and $\omega_{fr}$, the estimated steering angle outputting portion 110 for outputting the estimated steering angle $\theta_{est2}$ on the basis of the estimated steering angle $\theta_{est1}$ and the SAT detected value SAT2 and outputting the absolute value |ΔSAT| of the difference, and a steering angle estimating portion 100 for calculating and outputting an absolute steering angle $\theta_a$ on the basis of the estimated steering angles $\theta_{est1}$ and $\theta_{est2}$, the absolute value |ΔSAT| of the difference and a relative steering angle $\theta_m$. The relative steering angle $\theta_m$ is a relative steering angle constituted by dividing the motor rotational angle from the motor rotational angle sensor or the like by a speed reducing ratio of a steering system.

The absolute angle estimating portion 120 is constituted as shown by FIG. 7 and is constituted by an initial value storing portion 121 for storing an initial value by inputting the relative steering angle $\theta_m$, a subtracting portion 122 for calculating a steering angle change amount $\theta_{d1}$ of a difference between the relative steering angle $\theta_m$ and an output $\theta_{m0}$ of the initial value storing portion 121, an adding portion 123 for outputting an absolute steering angle $\theta_{d2}$ by adding the estimated steering angle $\theta_{est2}$ and the steering angle change mount $\theta_{d1}$, a subtracting portion 124 for subtracting the absolute steering angle $\theta_{d2}$ from the estimated steering angle $\theta_{est1}$, a limiter 125 for inputting the steering angle change amount $\theta_{d3}$ calculated at the subtracting portion 124 and restricting a maximum value thereof, a setting portion 126 for setting a fixed value 0, a comparing and determining portion 129 for comparing the absolute value |ΔSAT| of the difference and a previously set threshold $\Delta SAT_{th1}$ and outputting a switch signal SWa by measuring an elapse of a predetermined time period, a switching portion 127 respectively inputted with the fixed value 0 from the setting portion 126 at a contact and a steering angle change amount $\theta_{d4}$ from the limiter 125 at b contact and switching the contacts a, b by the switch signal SWa, and an adding portion 128 for adding to correct an output of the switching portion 127 and the absolute steering angle $\theta_{d2}$ and outputting the absolute steering angle $\theta_a$.

An absolute steering angle calculating portion is constituted by the initial value storing portion 121, the subtracting portions 122 and 124, and the adding portion 123, and a correcting and outputting portion is constituted by the comparing and determining portion 129, the switching portion 127, the limiter 125, and the adding portion 128.

In such a constitution, the estimated steering angle $\theta_{est1}$ from the steering angle estimating portion 100 is inputted to the vehicle model 111 and the switching portion 115 and inputted to the absolute steering angle estimating portion 120. Further, the absolute value |ΔSAT| of the difference SAT calculated at the absolute value forming portion 113 is inputted to the comparing and determining portion 114 and inputted to the absolute steering angle estimating portion 120. An operation of the comparing and determining portion 114 is similar to that of the first embodiment, the switch angle SW3 is outputted only when the absolute value |ΔSAT| of the difference becomes equal to or smaller than the set value $\Delta SAT_{th}$ and the predetermined time period has elapsed, the comparing and determining portion 114 makes the switching portion 115 ON and inputs the estimated steering angle $\theta_{est1}$ to the absolute steering angle estimating portion 120 as the estimated steering angle $\theta_{est2}$. When the absolute value |ΔSAT| of the difference exceeds the set value $\Delta SAT_{th}$, it is determined that the steering characteristic is changed and the switch signal SW3 is not outputted by determining that the steering angle is erroneously estimated and the estimated steering angle cannot be trusted, and the estimated steering angle $\theta_{est1}$ is not inputted to the absolute steering angle estimating portion 120 as the estimated steering angle $\theta_{est2}$ by making the switching portion 115 OFF.

At the absolute steering angle estimating portion 120, the steering angle change amount $\theta_{d1}$ constituting a subtraction result of the relative steering angle $\theta_m$ and the initial value $\theta_{m0}$ stored at the initial value storing portion 121 and the estimated steering angle $\theta_{est2}$ from the switching portion 115 are added at the adding portion 123, the absolute steering angle $\theta_{d2}$ constituting the addition result is subtracted from and inputted to the subtracting portion 124, and inputted to the adding portion 128. The steering angle change amount $\theta_{d3}$ constituting the difference between the estimated steering angle $\theta_{est1}$ and the absolute steering angle $\theta_{d2}$ calculated at the subtracting portion 124 is inputted to the limiter 125, and the steering angle change amount $\theta_{d4}$ restricted by the limiter 125 is inputted to the contact b of the switching portion 127.

On the other hand, the comparing and determining portion 129 is previously inputted with the set value $\Delta SAT_{th1}$ as the threshold, the comparing and determining portion 129 determines whether the absolute value |ΔSAT| of the difference becomes equal to or smaller than the set value $\Delta SAT_{th1}$ and the predetermined time period has elapsed, outputs the switch signal SWa when the absolute value |ΔSAT| of the difference becomes equal to or smaller than the set value $\Delta SAT_{th1}$ and the predetermined time period has elapsed, and sets the contact of the switching portion 127 to "b". Thereby, the steering angle change amount $\theta_{d4}$ from the limiter 125 is added to the absolute steering angle $\theta_{d2}$, the absolute steering angle $\theta_{d2}$ is corrected, and the corrected and further accurate steering angle is outputted as the absolute steering angle $\theta_a$. When the absolute value |ΔSAT| of the difference exceeds the set value $\Delta SAT_{th1}$, the contact of the switching portion 127 is set to "a", a fixed value "0" from the setting portion 126 is inputted to the adding portion 128, and correction of the absolute angle $\theta_{d2}$ is not carried out.

Although according to the forth embodiment, the output of the estimated steering angle $\theta_{est2}$ and the absolute steering angle are corrected on the basis of comparison of SAT, the output of the estimated steering angle $\theta_{est2}$ and the absolute steering angle may be corrected on the basis of comparison of the steering angle $\theta$.

Figure 12:
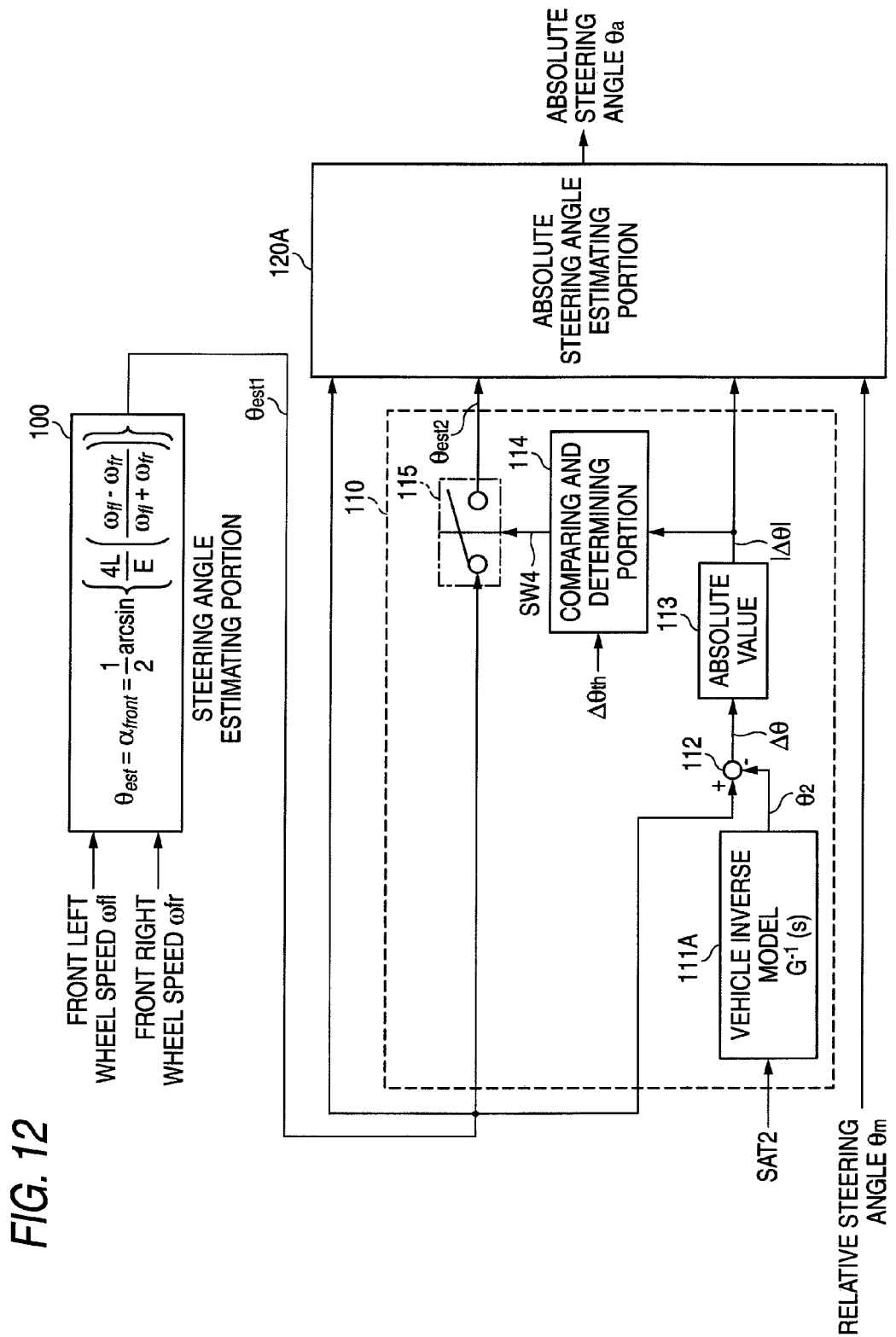
FIG. 12 is a block diagram showing a constitution example of a fifth embodiment of the invention.

FIG. 12 shows such a fifth embodiment in correspondence with FIG. 10, the calculated steering angle $\theta 2$ is calculated by way of a vehicle inverse model (G-1 (s)) 111A shown by Equation 7 from the SAT detected value SAT2, subtracted from the estimated steering angle $\theta_{est1}$ at the subtracting portion 112, and the absolute value $|\Delta\theta|$ of the difference $\Delta\theta$ is calculated at the absolute value forming portion 113. The absolute value $|\Delta\theta|$ of the difference $\Delta\theta$ is inputted to the comparing and determining portion 114, and the comparing and the determining portion 114 compares the absolute value with a previously inputted set value $\Delta\theta_{th}$ as the threshold. Further, when the absolute value $|\Delta\theta|$ of the difference becomes equal to or smaller than the set value $\Delta\theta_{th}$ and the predetermined time period has elapsed, the switch signal SW4 is outputted and the switching portion 115 is made ON. When the absolute value $|\Delta\theta|$ of the difference is larger than the set value $\Delta\theta_{th}$, the switch signal SW4 is not outputted and the estimated steering angle $\theta_{est2}$ is not outputted.

Figure 13:
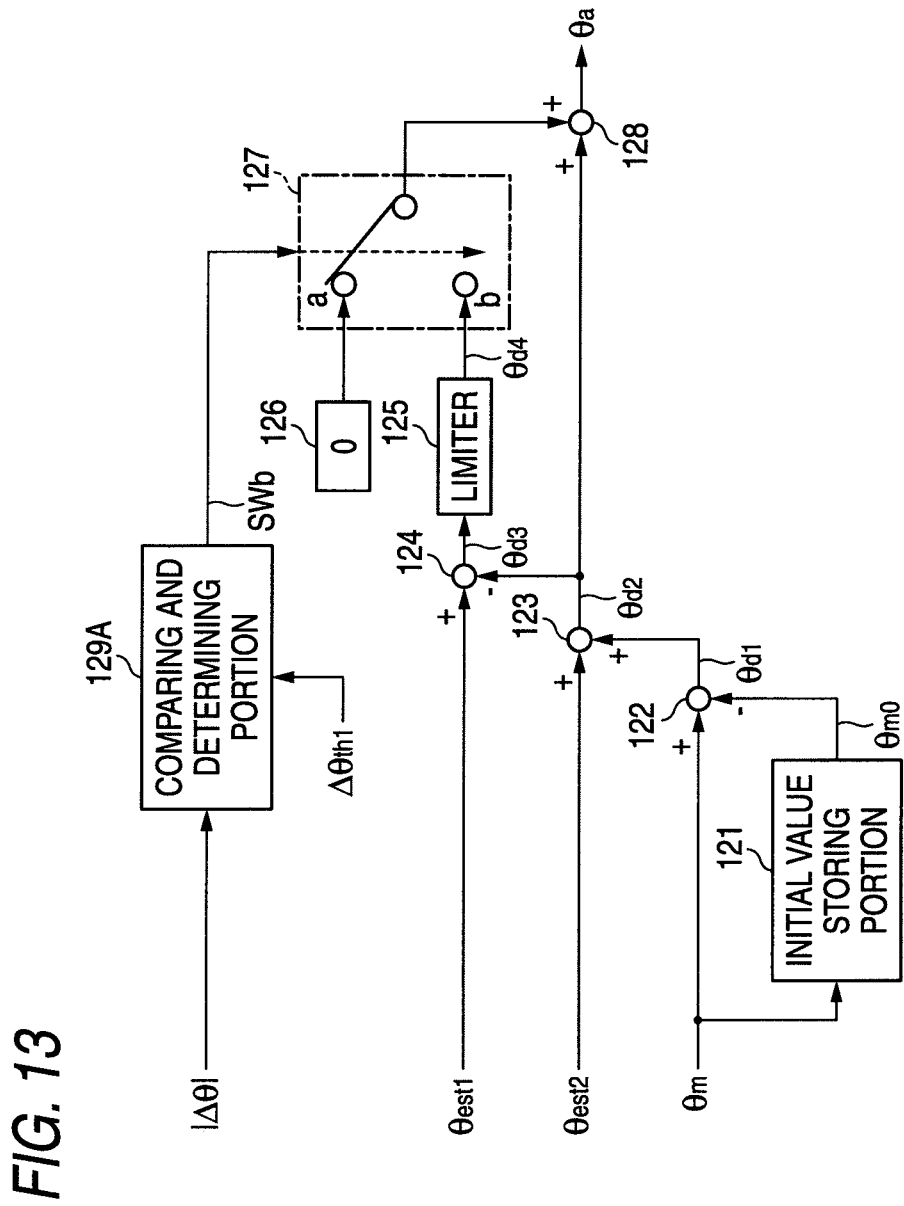
FIG. 13 is a block diagram showing a constitution example of an absolute steering angle estimating portion of the fifth embodiment of the invention.

Although the absolute steering angle estimating portion 120A according to the fifth embodiment is constructed by a constitution substantially similar to that of the absolute steering angle estimating portion 120 in the forth embodiment, as shown by FIG. 13, the comparing and determining portion 129A determines whether the absolute value $|\Delta\theta|$ of the difference becomes equal to or smaller than the set value $\Delta\theta_{th1}$ and the predetermined time period has elapsed, outputs a switch signal SWb when the absolute value $|\Delta\theta|$ of the difference becomes equal to or smaller than the set value $\Delta\theta_{th1}$ and the predetermined time period has elapsed and sets the contact of the switching portion 127 to "b". Thereby, the steering angle change amount $\theta_{d4}$ from the limiter 125 is added to the absolute steering angle $\theta_{d2}$, the absolute steering angle $\theta_{d2}$ is corrected, and the corrected and further accurate steering angle is outputted as the absolute steering angle $\theta_a$. When the absolute value $|\Delta\theta|$ of the difference exceeds the set value $\Delta\theta_{th1}$, the contact of the switching portion 127 is set to "a", the fixed value "0" from the setting portion 126 is inputted to the adding portion 128 and correction of the absolute steering angle $\theta_{d2}$ is not carried out.

Figure 14:
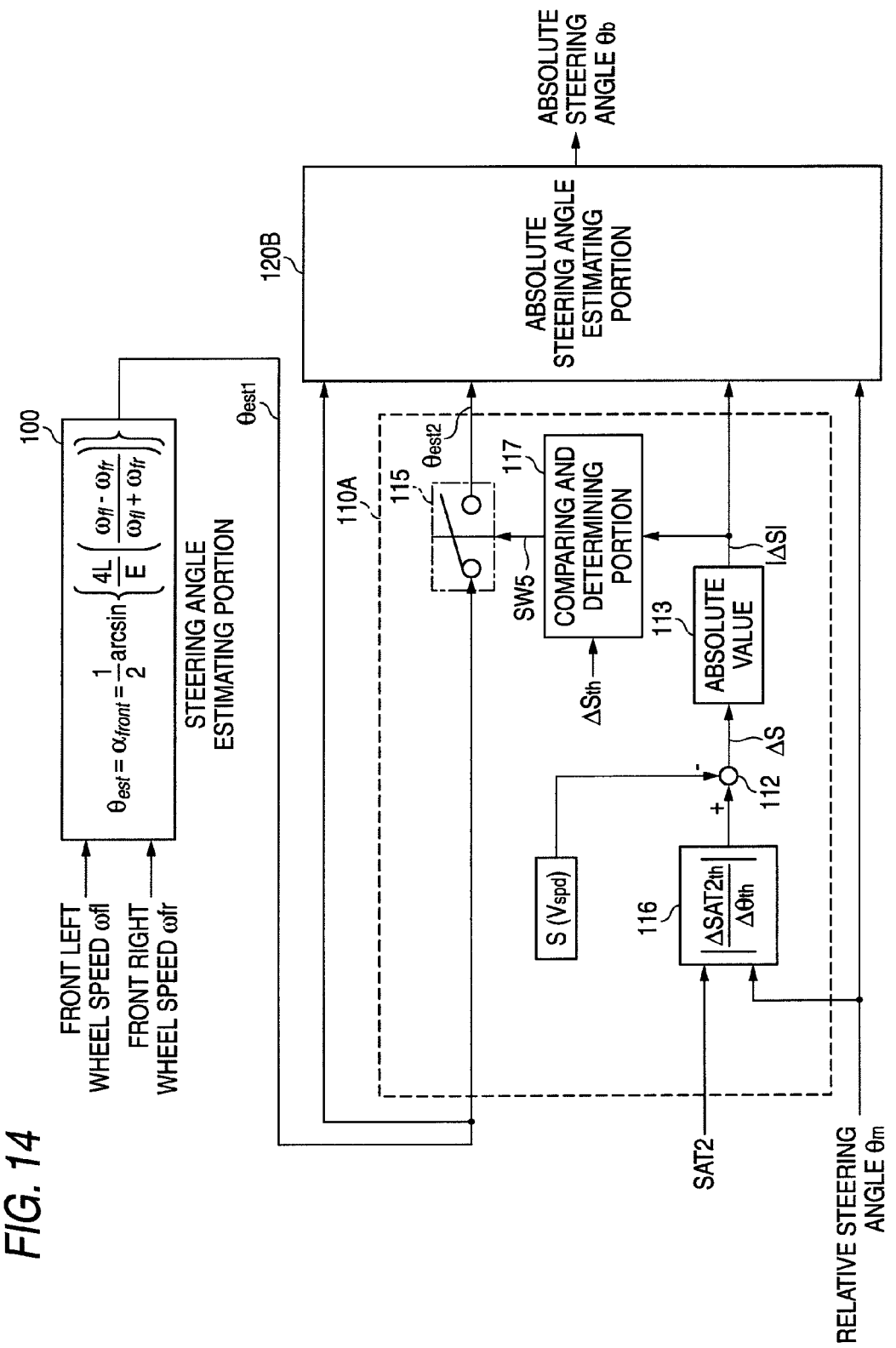
FIG. 14 is a block diagram showing a constitution example of a sixth embodiment of the invention.
Figure 15:
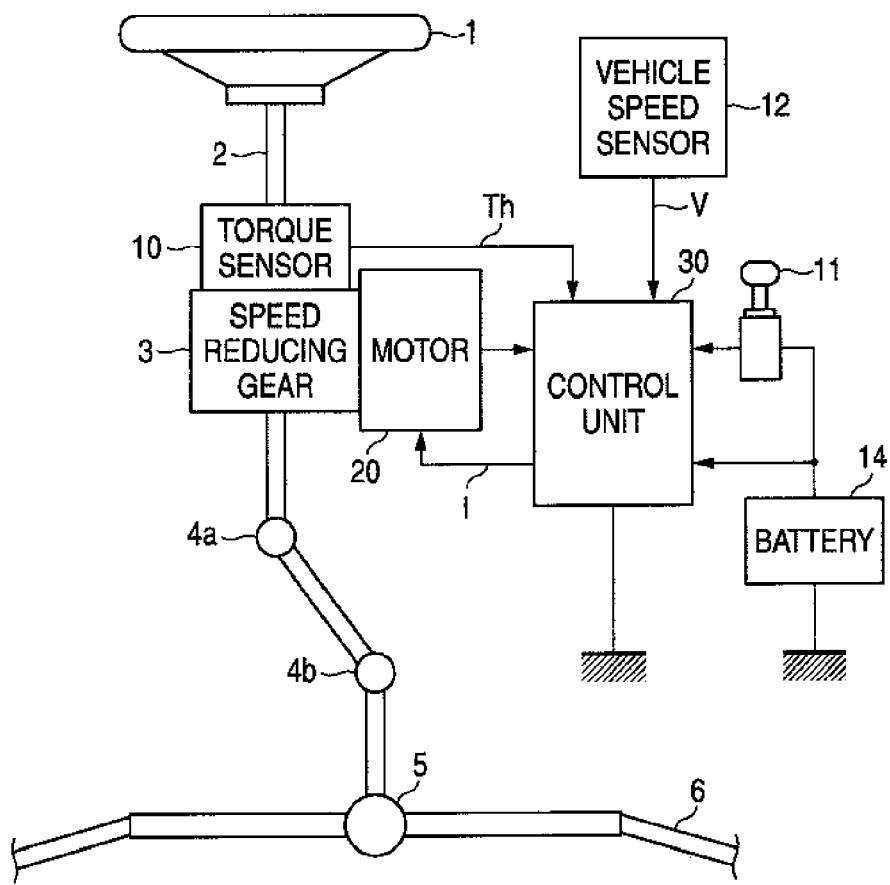
FIG. 15 is a view showing a constitution example of a steering apparatus of a background art.
Figure 16:
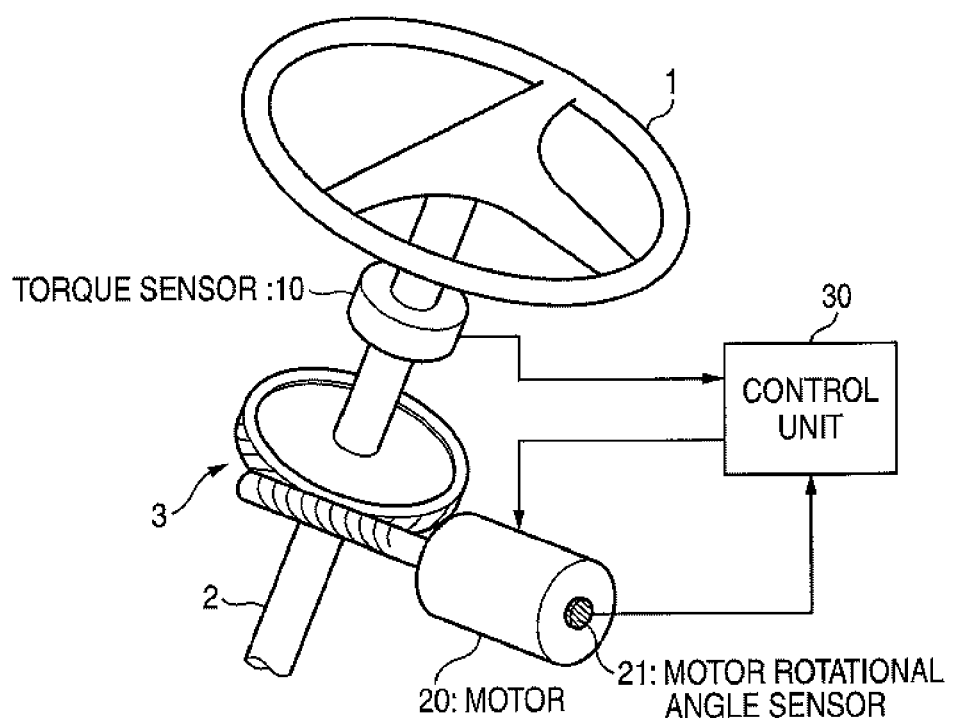
FIG. 16 is a view showing an example of an essential portion of a steering mechanism.
Figure 17:
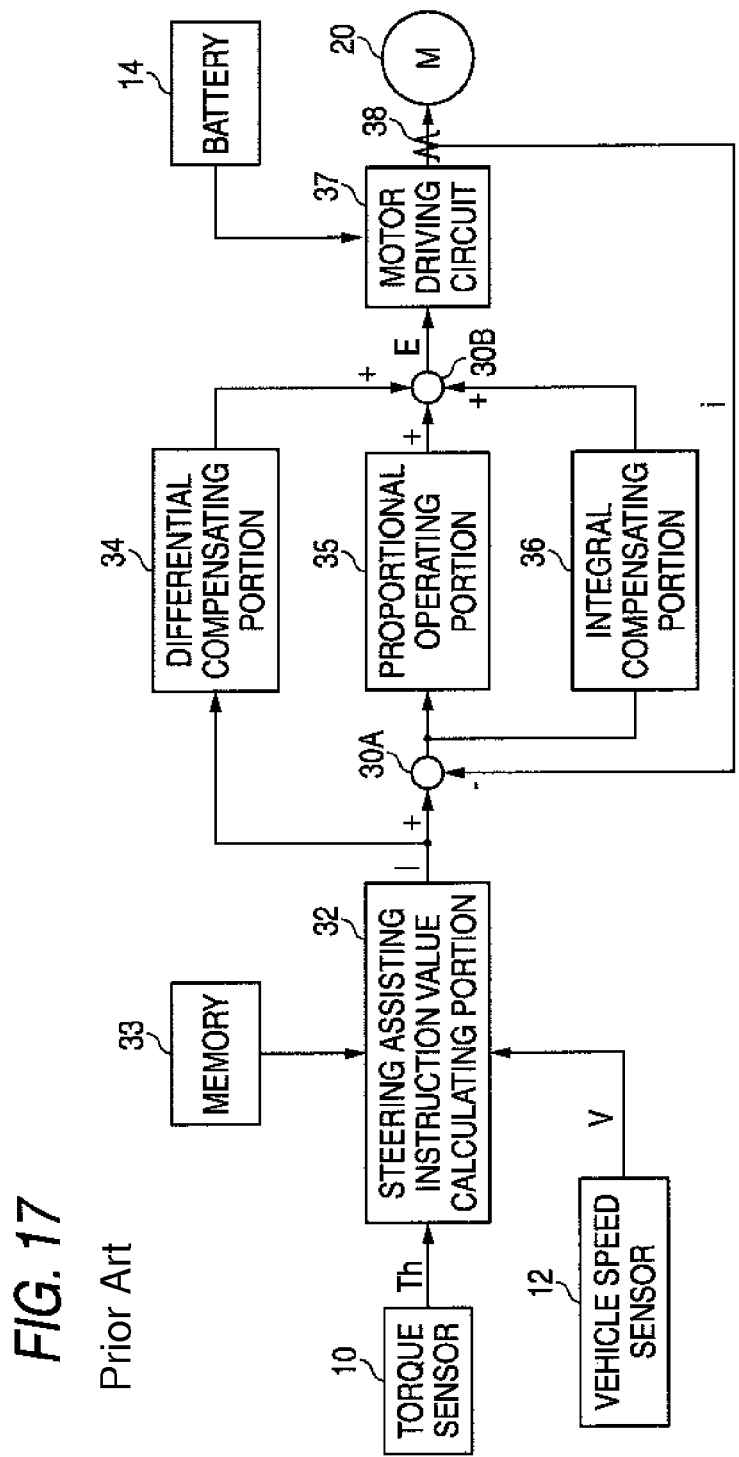
FIG. 17 is a block diagram showing a constitution example of a control unit of a steering apparatus of a background art.

Next, a vehicular steering angle estimating apparatus of a sixth embodiment will be explained in reference to FIG. 14 in correspondence with FIG. 10. A estimated steering angle estimating portion 110A of the sixth embodiment is constituted by a change rate calculating portion 116 for calculating an absolute value $|\Delta SAT2/\Delta\theta_m|$ of a change rate of the SAT detected value SAT2 relative to the relative steering angle $\theta_m$, a subtracting portion 112 for calculating a change rate difference $\Delta S$ by subtracting a predetermined value S (Vspd) set by a vehicle speed from the change rate absolute value $|\Delta SAT1/\Delta\theta_m|$, an absolute value forming portion 113 for outputting an absolute value $|\Delta S|$ of the change rate difference $\Delta S$, a comparing and determining portion 117 for comparing the absolute value $|\Delta S|$ of the change rate difference $\Delta S$ with a predetermined value $\Delta S_{th}$ set as a threshold and outputting a switch signal SW5 by measuring an elapse of a predetermined time period, and the switching portion 115 for making ON/OFF by the switch signal SW5 from the comparing and determining portion 117.

Figure 11:
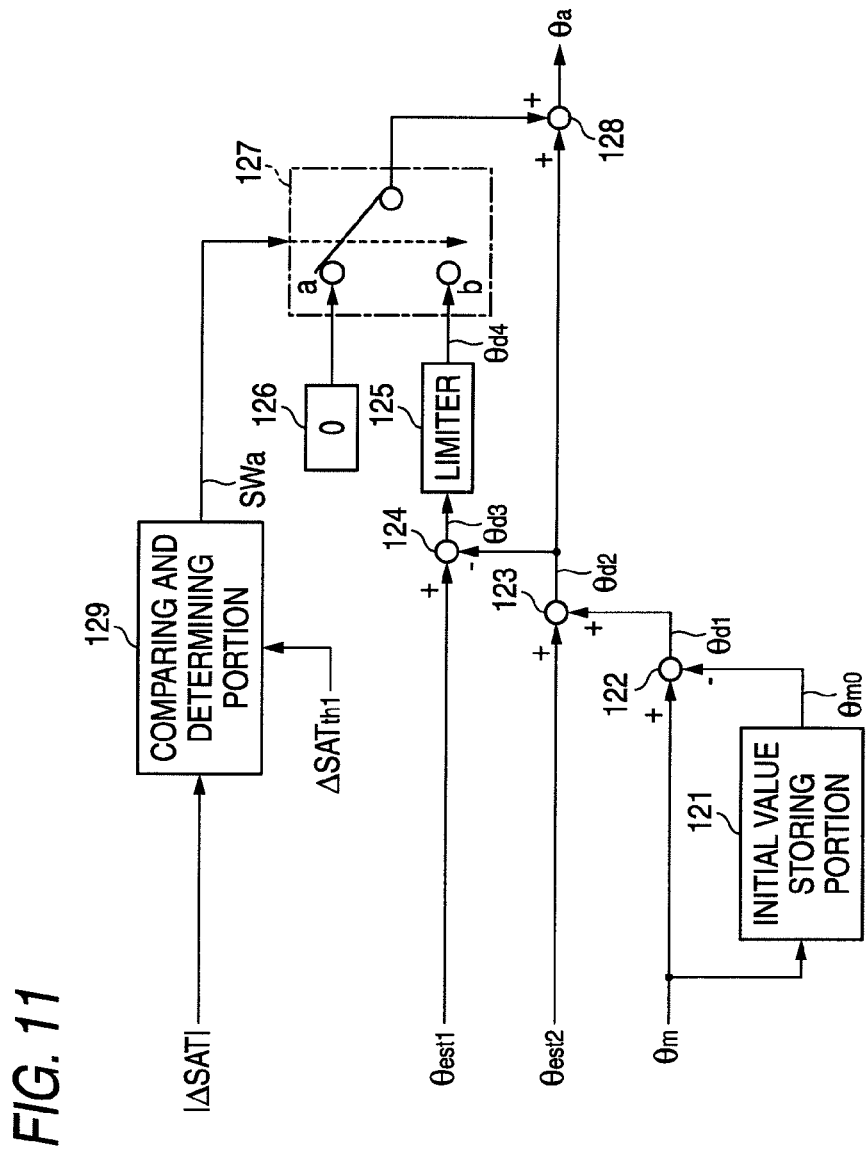
FIG. 11 is a block diagram showing a constitution example of an absolute steering angle estimating portion of the forth embodiment of the invention.

The absolute steering angle estimating portion 120B of the sixth embodiment corresponds to the absolute steering angle estimating portion 110A shown in FIG. 11, the absolute value $|\Delta S|$ of the change rate difference $\Delta S$ is inputted in place of the absolute value $|\Delta SAT|$ of the difference. That is, the absolute value $|\Delta S|$ of the change rate difference $\Delta S$ is inputted to the comparing and determining portion 129 in place of the absolute value $|\Delta SAT|$ of the difference shown in FIG. 11, the comparing and determining portion 129 determines whether the absolute value $|\Delta S|$ of the change rate difference $\Delta S$ becomes equal to or smaller than the set value $\Delta S_{th1}$ and the predetermined time period has elapsed and corrects the absolute steering angle $\theta_{d2}$ by setting the contact of the switching portion 127 to "h" by outputting the switch signal SW5 when the absolute value $|\Delta S|$ of the change rate difference $\Delta S$ becomes equal to or smaller than the set value $\Delta S_{th1}$ and the predetermined time period has elapsed.

In such a constitution, the estimated steering angle $\theta_{est1}$ from the steering angle estimating portion 100 is inputted to the absolute value steering angle estimating portion 120B and the switching portion 115, and the change rate calculating portion 116 calculates the absolute value $|\Delta SAT2/\Delta\theta_m|$ of the change rate of the SAT detected value SAT2 relative to the relative steering angle $\theta_m$ on the basis of the SAT detected value SAT2 and the relative steering angle $\theta_m$. The change rate absolute value $|\Delta SAT1/\Delta\theta_m|$ calculated at the change rate calculating portion 116 is inputted to the subtracting portion 112, and at the subtracting portion 112, the change rate difference $\Delta S$ constituting a difference of the absolute value and the predetermined value S (Vspd) set by the vehicle speed is calculated. The change rate difference $\Delta S$ is made to constitute the absolute value $|\Delta S|$ of the change rate difference $\Delta S$ by the absolute value forming portion 113, and the absolute value $|\Delta S|$ of the change rate difference $\Delta S$ is inputted to the comparing and determining portion 117 and inputted to the absolute steering angle estimating portion 120B. An operation of the comparing and determining portion 117 is similar to those of the respective embodiments, the switch angle SW5 is outputted only when the absolute value $|\Delta S|$ of the change rate difference $\Delta S$ becomes equal to or smaller than the set value $\Delta S_{th}$ and the predetermined time period has elapsed and the estimated steering angle $\theta_{est1}$ is inputted to the absolute steering angle estimating portion 120B as the estimated steering angle $\theta_{est2}$. When the absolute value $|\Delta S|$ of the change rate difference $\Delta S$ exceeds the set value $\Delta S_{th}$, it is determined that the steering characteristic is changed, the switch signal SW5 is not outputted by determining that the steering angle is erroneously estimated and the estimated steering angle cannot be trusted, and the estimated steering angle $\theta_{est1}$ is not inputted to the absolute steering angle estimating portion 120B as the estimated steering angle $\theta_{est2}$.

The absolute steering angle estimating portion 120B carries out an operation similar to that of the absolute steering angle estimating portion 120A according to the third embodiment, and outputs the absolute steering angle $\theta_b$ by carrying out correction only when the absolute value $|\Delta S|$ of the change rate difference $\Delta S$ becomes equal to or smaller than the set value $\Delta S_{th1}$ and the predetermined time period has elapsed. When the absolute value $|\Delta S|$ of the change rate difference $\Delta S$ exceeds the set value $\Delta S_{th1}$, the fixed value "0" is added, and the absolute steering angle $\theta_b$ is outputted without carrying out correction.

Further, although according to all of the first embodiment through the fifth embodiment, an explanation has been given by taking an example in which only the front wheel rotational speeds $\omega_{fl}$ and $\omega_{fr}$ can be utilized, the invention is applicable to a vehicle kind in which only the rear wheel rotational speeds $\omega_{rl}$ and $\omega_{rr}$ can be utilized and in this case, the steering angle is estimated on the basis of Equation 2 shown above. Further, the invention is applicable similarly also to a case of four wheel rotational speeds.

What is claimed is:

1. A vehicular steering angle estimating apparatus comprising:
   wheel rotational speed sensors configured to detect rotational speeds of left and right wheels of a vehicle at a front or rear of the vehicle,
   a steering angle estimating portion configured to calculate an estimated steering angle of the wheels on the basis of the rotational speeds of the wheels detected by the wheel rotational speed sensors, and
   an estimated steering angle outputting portion configured to output the estimated steering angle on the basis of an SAT detected value or an SAT estimated value,
   wherein the estimated steering angle outputting portion comprises:
   an SAT calculating section configured to calculate an SAT calculated value on the basis of the estimated steering angle,
   a comparing and determining section configured to compare an absolute value of a difference between the SAT calculated value and the SAT detected value or the SAT estimated value with a threshold, and
   a switching section configured to turn an output of the estimated steering angle on and off on the basis of a result of comparison by the comparing and determining section.

2. The vehicular steering angle estimating apparatus according to claim 1, wherein
   the comparing and determining section is made to output the estimated steering angle by way of the switching section, when the absolute value of the SAT difference continues to be equal to or smaller than the threshold for a predetermined time period or more.

3. The vehicular steering angle estimating apparatus according to claim 2, wherein
   the comparing and determining section is made not to output the estimated steering angle, when the absolute value of the SAT difference is larger than the threshold.

4. The vehicular steering angle estimating apparatus according to claim 1, further comprising:
   a motor rotational angle sensor configured to detect a motor rotational angle of a motor for exerting a steering assisting force to a steering system of the vehicle, and
   an absolute steering angle estimating portion configured to output a first absolute steering angle 1 by the estimated steering angle, the absolute value of the SAT difference, and a relative steering angle obtained by dividing the motor rotational angle by a speed reducing ratio of the steering system.

5. The vehicular steering angle estimating apparatus according to claim 4, wherein
   the absolute steering angle estimating portion comprises:
   an absolute steering angle calculating portion configured to calculate a second absolute steering angle 2 on the basis of the estimated steering angle and the relative steering angle, and
   a correcting and outputting portion configured to output the first absolute steering angle obtained by correcting the second absolute steering angle, when the absolute value of the SAT difference is equal to or smaller than the threshold and a predetermined time period has elapsed.

6. The vehicular steering angle estimating apparatus according to claim 4, wherein
   the comparing and determining section outputs the estimated steering angle by way of the switching section, when the absolute value of the SAT difference is equal to or smaller than the threshold and continued for a predetermined time period or more.

7. The vehicular steering angle estimating apparatus according to claim 6, wherein
   the comparing and determining section is made not to output the estimated steering angle, when the absolute value of the SAT difference is larger than the threshold.

8. An electric power steering apparatus comprising:
   the vehicular steering angle estimating apparatus according to claim 4.

9. An electric power steering apparatus comprising:
   the vehicular steering angle estimating apparatus according to claim 1.

10. The vehicular steering angle estimating apparatus according to claim 1, wherein the steering angle estimating portion is configured to calculate the estimated steering angle on the basis of the rotational speeds of the wheels only at the front or rear of the vehicle.

* * * * *